United States Patent [19]
Bingaman

[11] 4,090,691
[45] May 23, 1978

[54] AUTOMATIC TURNBUCKLE

[76] Inventor: Harold J. Bingaman, 6309 Pentz-Magalia Hwy., Paradise, Calif. 95969

[21] Appl. No.: 811,542

[22] Filed: Jun. 30, 1977

[51] Int. Cl.² ............................................ B66F 19/00
[52] U.S. Cl. ...................................... 254/51; 24/68 B
[58] Field of Search ............................. 254/51, 52, 66; 24/68 R, 68 B, 685 B

[56] References Cited

U.S. PATENT DOCUMENTS

| 1,247,760 | 11/1917 | Wengraf | 24/68 B |
| 1,632,644 | 6/1927 | Crowell | 24/68 B |

Primary Examiner—Robert C. Watson

[57] ABSTRACT

There is provided a mechanized device having the same basic uses as a turnbuckle and herein referred to as an automatic turnbuckle. The automatic turnbuckle of the present invention is designed to mechanically remove slack from a line and to keep a constant tension on a line. The structure of the present invention includes two protruding rods, one at either end of an elongated body which houses the mechanism. The exposed ends of the rods are looped. In the housing, the rods move parallel to each other and are connected by a spring and gear arrangement which allows manual movement of one of the rods in two directions and mechanical movement in one direction. There is a means included in the device for adjusting the movable rod to various pull lengths and for manually triggering a pulling action. The same means can be used to lock the rods into a fixed position.

7 Claims, 4 Drawing Figures

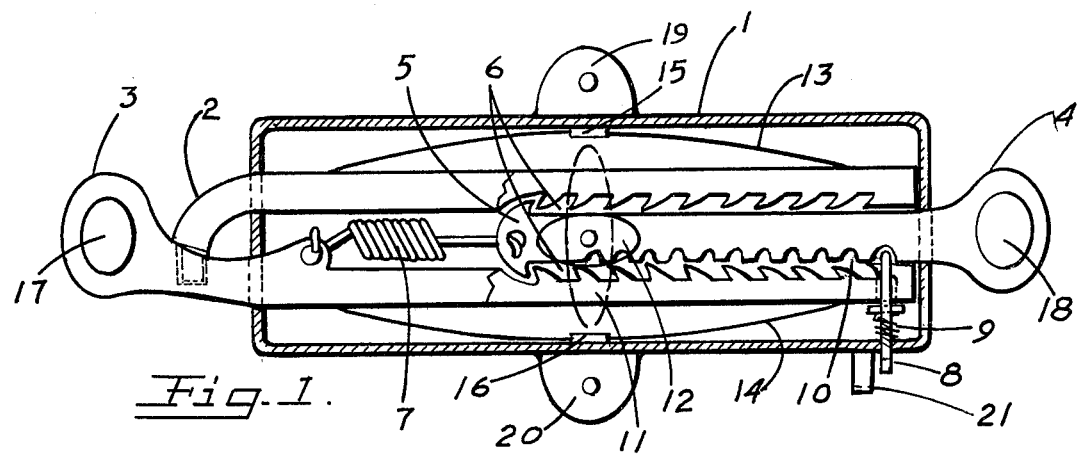
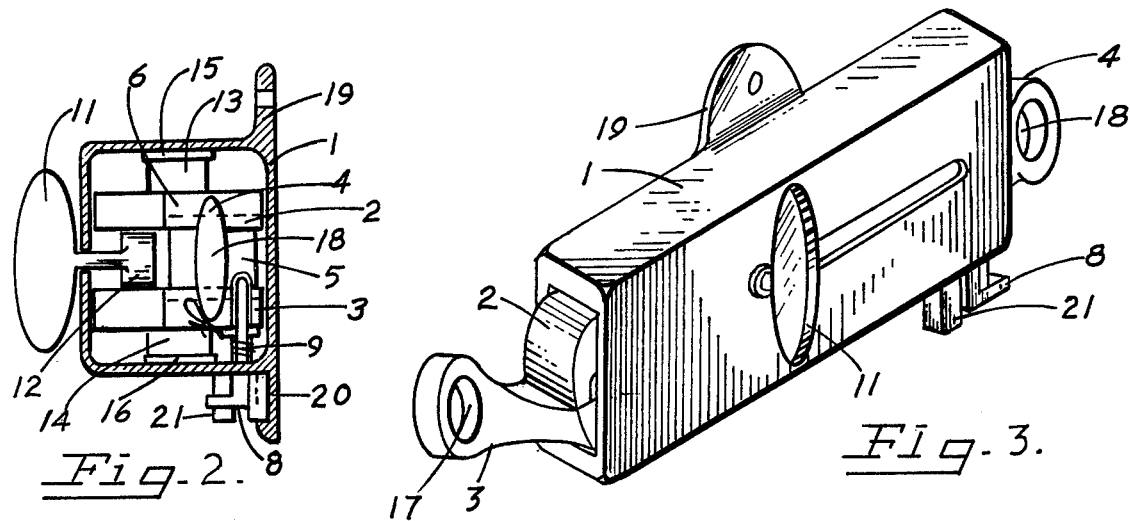
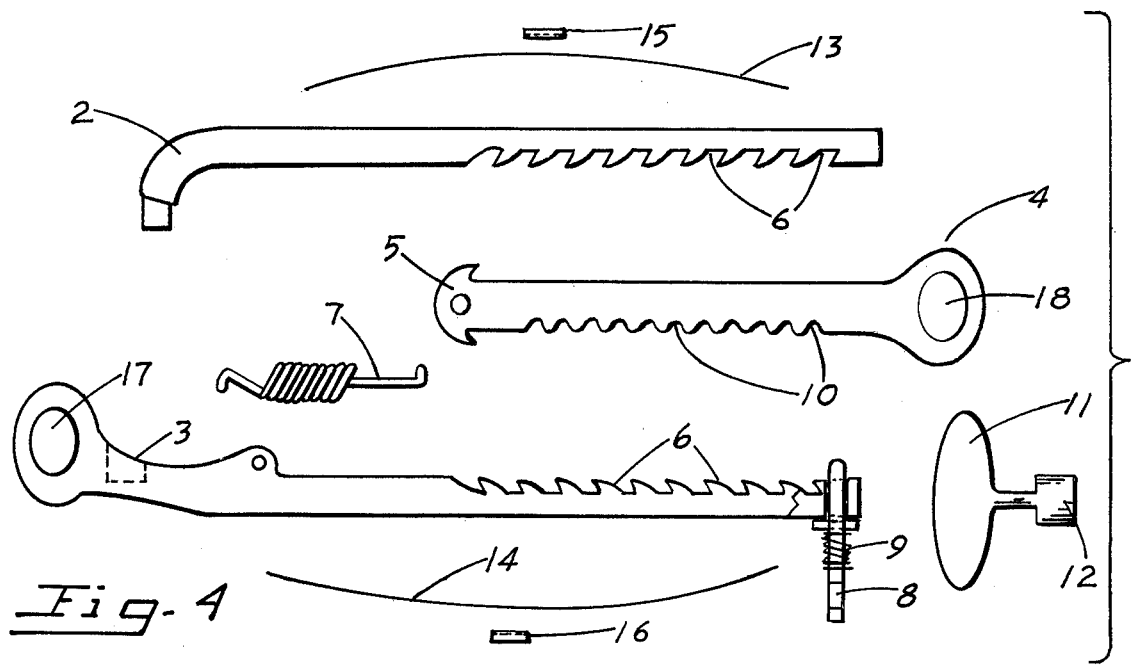

AUTOMATIC TURNBUCKLE

The present invention relates to turnbuckles and other mechanical devices which are manually adjustable and used primarily for retaining a desired tension in a line and for other similar purposes.

Many good products are being manufactured for the tightening of retaining ropes, guy lines, and for other purposes where adjustable retension is needed. Turnbuckles have long been standard equipment for a good many of these needs because of the easy variation in size of this versatile device. Wenches and other mechanical tighteners can be found for a multiple of need situations. Although many of these tools and machines are adjustable and some are in various degrees regulatable, most must be manually operated.

Therefore, it is the primary object of this invention to provide a device similar to a turnbuckle, herein referred to as automatic turnbuckle, which, when set and triggered, is fully self-adjusting to automatically remove slack from a line or cable as the slack occurs.

Another object of the invention is to provide a tool for use where the automatic maintenance of given tensions on certain lines or surfaces might be necessary.

A further object of the invention is to provide a tool which will automatically tighten a line and has means for resetting or readjusting the tension before being attached to a line and after it has been attached to a line while in use.

A still further object of the present invention is to provide an adjustable tool for automatically tightening lines which can be manufactured in sizes as needed easily.

The present invention, herein referred to as an automatic turnbuckle, is structured for use where the automatic turnbuckle of the present invention would be an improvement over a manually adjusted turnbuckle or other similar devices.

In the embodiment, the present invention consists of two parallel rods each having a single loop formed at one end. The rods are encased in an elongated housing parallel to each other with the loop on one rod protruding from one end of the housing while the loop on the other rod protrudes from the opposite end of the housing. When the assemblage is viewed from the front with housing removed, the left protruding rod is in the lowest position and has a rack teeth arrangement in the upper side. The right protruding rod is shorter, has teeth in the downward side, and affixed to the inner end is a half circle head which is wider than the rod. A third rod having rack teeth in the lower side rides on top of the right protruding rod. This third, top-riding rod, has a curved neck which loops around to fit into a socket on the protruding neck of the lowest rod. The upper and lower angled edges of the half circle head attached to the center rod fits the rack teeth of the upper and lower rods in a manner which allows movement in only one direction. A spring pulls on the center rod for mechanical movement and for positioning the rod. Assembled and encased, the structure is held together by leaf springs inside the top and bottom of the housing. The leaf springs allow up and down movement of the rods, and a thumb screw fitting affixed to an oblong wheel can be turned to separate the rods. Separating the rods releases the half circle head of the centered rod from the teeth in the upper and lower rods, this allows moving the centered rod for adjusting the position of pull movement. The thumbscrew can be turned as well as slid back and forth for adjusting or cocking purposes. A manual locking and triggering catch is affixed through the housing on the underside at the right end. A pin on the trigger shaft fits the teeth in the center rod, and the center rod can be retained in different positions and released by locking the trigger in an up or down position. The trigger shaft is spring loaded, and the trigger end is retained in a special catch structured in the bottom of the housing.

All of the aforementioned as well as additional features of the present invention will become more clearly apparant upon reading the following detailed description thereof and referring to the accompanying drawings in which similar characters of reference represent corresponding parts in each of the several views.

In the drawings:

FIG. 1 is a side view of the invention with the front section of the housing removed to show the arrangement of parts and the internal mechanism;

FIG. 2 shows an end view of the invention with housing removed to disclose the position of the thumbscrew release and trigger lock;

FIG. 3 is a perspective view of the automatic turnbuckle assembled and encased showing relative positions of the thumbscrew, the adjustment slot, and the lock assembly, and FIG. 4 illustrates in detail the internal parts of the present invention disassembled.

Referring now more specifically to the drawings, the automatic turnbuckle characterizing the present invention comprises exterior housing 1 containing upper rod 2 fitted at the neck by a mated fitting to lower rod 3 supporting between them center rod 4, these rods heretofore being described as top-riding rod 2, left protruding rod 3, and right protruding rod 4 are illustrated according to placement in the housing and hereafter described accordingly.

The inner end of rod 4 is affixed with half-circle head 5 shaped to fit teeth 6 in both upper rod 2 and lower rod 3 with center rod 4 being attached to lower rod 3 by pull spring 7. The arm and pin extension of trigger 8 extends through compression spring 9 and fits into teeth 10 to lock center rod 4 into various pull positions. Thumbscrew 11 is attached to oblong wheel 12 by a shaft inserted through a slot in housing 1. Oblong wheel 12 rides between upper rod 2 and lower rod 3. Leaf springs 13 and 14 hold upper rod 2 and lower rod 3 in position, and the two leaf springs are retained by fittings 15 and 16 respectively. When the automatic turnbuckle of the present invention is assembled, loops 17 and 18 are the line connectors. Fixtures 19 and 20 are exterior mounting brackets for use when a fixed mounting is needed. 21 is the trigger guard and retainer.

In operation, loop 17 is attached to a line. Trigger 8 is pulled down against the pressure of compression spring 9 and by turning locked over retainer 21. Thumbscrew 11 is turned a half turn separating upper rod 2 and lower rod 3 and making movement of center rod 4 in either direction possible. The automatic turnbuckle of the present invention can now be adjusted to a desired position by pulling on loop 18 or by sliding thumbscrew 11 along the track in the housing 1. When the desired length of pull is reached, trigger 8 can be turned and released to hold center rod 4 fully extended or in a selected position. The line to be kept tight is fastened to loop 18 and trigger 8 is again pulled down and turned to be held by retainer 21. With the action triggered in this manner, center rod 4 pulled by spring 7 can move only in one direction. Any slack in the attached lines occurring at either loop 17 or loop 18 will be pulled out of the line by spring 7 as center rod 4 is pulled along teeth 6 and retained in each new position. The size and strength of spring 17 is not critical except where a specific tension is required. The amount of slack which can be moved from any given line normally depends only on the size of the automatic turnbuckle used.

I claim:

1. A tool for automatically removing slack from a line comprising two parallel rods each having a single loop formed at one end and encased in an elongated housing with said loops protruding from opposite end of the housing, the looped rods adjacent in the housing to a third rod curved at the end and loosely attached to one of the protruding rods near the loop by mated fittings to form a U with the other looped rod centered therein, there being a spring means for holding the three rods together within the housing; the centered rod having a half-circle head on the inner end arranged to fit opposing rack teeth machined into the other two rods, the center rod having unmatching rack teeth in one side for locking positions used in conjunction with a spring-loaded trigger and lock pin; and with the center-positioned rod being attached to the other looped rod by a pull spring arranged for one direction automatic movement and being manually adjustable in either direction when the adjacent rods are separated by turning an oblong wheel affixed to an exterior thumbscrew.

2. A tool for automatically removing slack from a line as claimed in claim 1, wherein a rod having a loop in one end and a second rod having a curved end are slip-joined together loosely by mated fittings to form a movable U with inward angled opposing rack teeth, said U-joined rods having a principal part of the one-directional mechanism.

3. A tool for automatically removing slack from a line as claimed in claim 1, wherein a single straight rod having a loop in one end, a row of rack teeth along one side, and on the other end, a half-circle, arrowhead fitting with outer edges angled for movement in one direction only when fitted to a movable retainer.

4. A combination of claim 2, wherein two rods are affixed in a mobile manner to form a U arranged with inward-angled, opposing rack teeth, said teeth fitted to a rounded, half-circle head on a third rod are combined in a retainer with means for compressing the U-arms against the head of the centered rod and releasing said head when separating pressure is applied against the U-arms by one directional movement of the centered rod and by manual adjustment, the U-arms automatically regripping said head to prevent a reverse movement of the centered rod and regripping said head in the same manner after manual resetting.

5. A combination of claim 4, whereas the U-arranged rods and the centered, headed rod when assembled are attached by an extension spring exerting a pulling force on the centered rod and being an integral part necessary for the automatic, one-directional movement of the centered rod.

6. A tool for automatically removing slack from a line as claimed in claim 1, wherein a manual means for spreading the U-arranged rods is supplied, the form being an exterior thumbscrew affixed to an oblong wheel by a shaft through a slot in the housing; the thumbscrew, shaft, and oblong wheel turnable and capable of movement along said housing slot manually as needed to release the centered rod for movement in either direction.

7. A tool for automatically removing slack from a line as claimed in claim 1, wherein a manual means for locking the centered rod into a fixed position is supplied, the means herein being a spring-loaded trigger and pin shaft, the pin sized to fit the row of rack teeth along one side of the centered rod, the exterior end bent at a right angle to the shaft and arranged to lock over a trigger guard and retainer on the housing.

* * * * *